United States Patent

[11] 3,621,010

| [72] | Inventor | George Albert Boswell, Jr. |
|---|---|---|
| | | Wilmington, Del. |
| [21] | Appl. No. | 31,763 |
| [22] | Filed | Apr. 24, 1970 |
| [45] | Patented | Nov. 16, 1971 |
| [73] | Assignee | E. I. du Pont de Nemours and Company |
| | | Wilmington, Del. |
| | | Continuation-in-part of application Ser. No. 720,493, Apr. 11, 1968, now Patent No. 3,511,861, Continuation-in-part of application Ser. No. 5,139, Jan. 22, 1970. This application Apr. 24, 1970, Ser. No. 031,763 |

[54] 6,6-DIFLUORO-17β-HYDROXY-17α-ETHYNYL-4-ESTREN-3-ONE AND 6,6-DIFLUORO-13β-ETHYL-17β-HYDROXY-17α-ETHYNYL-4-GONEN-3-ONE ETHYLENE
3 Claims, No Drawings

[52] U.S. Cl. .................................................. 260/239.55,
260/397.3, 260/397.4, 260/397.5, 260/999
[51] Int. Cl. ....................................................... C07c 173/00

[50] Field of Search............................................... /Machine
Searched Steroids

[56] References Cited
UNITED STATES PATENTS
3,219,673   11/1965   Boswell ......................... 260/397.3

*Primary Examiner*—Henry A. French
*Attorney*—James H. Ryan

ABSTRACT:   6,6-Difluoro-17β-hydroxy-17α-ethynyl-4-estren-3-one ethylene ketal (6,6-difluoronorethindrone ethylene ketal), which can be obtained i.a. by a reaction of 6,6-difluoro-4-estren-3,17-dione 3-ethylene ketal with either ethynylmagnesium bromide or sodium acetylide, is an active progestational and antiuterotrophic agent. Its biological activity in rabbits and mice is comparable to that of norethindrone. Similarly, 6,6-difluoro-13β-ethyl-17β-hydroxy-17α ethynyl-4-gonen-3-one ethylene ketal, obtained by reaction of the corresponding 3,17-dione 3-ethylene ketal with acetylene and lithium acetylide, is active.

6,6-DIFLUORO-17β-HYDROXY-17α-ETHYNYL-4-ESTREN-3-ONE AND 6,6-DIFLUORO-13β-ETHYL-17β-HYDROXY-17α-ETHYNYL-4-GONEN-3-ONE ETHYLENE

CROSS-REFERENCE TO RELATED APPLICATIONS

This is a continuation-in-part of applications Ser. No. 720,493, filed Apr. 11, 1968 and now allowed as U.S. Pat. No. 3,511,861, and Ser. No. 5,139, filed Jan. 22, 1970.

BACKGROUND OF THE INVENTION

This invention is related to the steroid compounds 6,6-difluoro-17β-hydroxy-17α-ethynyl-4-estren-3-one ethylene ketal, and 6,6-difluoro-13β-ethyl-17β-hydroxy-17α-ethynyl-4-gonen-3-one ethylene ketal which have valuable progestational and antiuterotrophic properties.

The parent applications Ser. No. 720,493 discloses new steroid compounds derived from 6,6-difluoro-17α-ethynyl-17β-hydroxy-4-estren-3-one. Example 3 of said parent application describes the synthesis of 6,6-difluoro-17α-ethynyl-4-estrene-3β,17β-diol. Step J of that multistep synthesis describes the preparation of 6,6-difluoro-17α-ethynyl-17β-hydroxy-4-estren-3-one (6,6-defluoronorethindrone). An intermediate in this reaction is 6,6-difluoro-17β-hydroxy-17α-ethynyl-4-estren-3-one ethylene ketal from which 6,6-difluoronorethindrone is obtained by hydrolysis with 90 percent acetic acid. The parent application Ser. No. 720,493 does not report any biological properties of this compound.

The parent application Ser. No. 5,139 discloses in step J of example 1 6,6-difluoro-13β-ethyl-17βhydroxy-17α-ethynyl-4-gonen-3-one 3-ethylene ketal, the 13-ethyl homolog of the above-mentioned 6,6-difluoro-17β-hydroxy-17α-ethynyl-4-estren-3-one ethylene ketal. Again, no biological properties of the 13-ethyl steroid are reported.

U.S. Pat. No. 3,219,673 (to Boswell) discloses in example 6 the ethylene ketal of 17α-ethynyl-6,6-difluoro-4-androstene-3-one-17β-01 from which the free compound (6,6-difluoroethisterone) is obtained by hydrolysis with aqueous hydrochloric acid. No biological properties of this compound are disclosed in the patent.

SUMMARY OF THE INVENTION

According to this invention, it has now been discovered that 6,6-difluoro-17cs-hydroxy-17α-ethynyl-4-estren-3-one ethylene ketal and 6,6-difluoro-13β-ethyl-17β-hydroxy-17α-ethynl-4-gonen-3-one ethylene ketal have valuable biological properties. In particular, these compounds have progestational activity in rabbits and antiuterotrophic activity in mice of the same magnitude as the commercial material norethindrone. The novel compounds of this invention can be represented by the following formula 1:

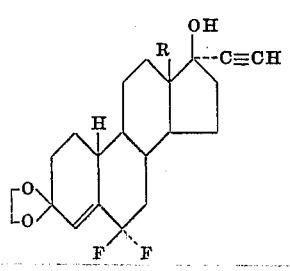

(1)

in which R is methyl or ethyl.

DETAILED DESCRIPTION OF THE INVENTION

The novel 13-methyl steroid compound of this invention can be conveniently prepared either by ethynylation and simultaneous reduction of 6,6-difluoro-4-estrene-3,17-dione 3-ethylene ketal or by ketalization of 6,6-difluoro-norethindrone. Both these starting materials are described in the parent application Ser. No. 720,493, example 3, Steps I and J. The preparation of this new compound is now illustrated by examples 1 and 2. The 13-ethyl steroid compound of this invention is obtained by the procedure of example 3.

EXAMPLE 1

Preparation of 6,6-difluoro-13β-ethyl-17β-hydroxy-17α-ethynyl-4-estren-3-one ethylene ketal from 6,6-difluoro-4-estren-3,17-dione 3-ethylene ketal

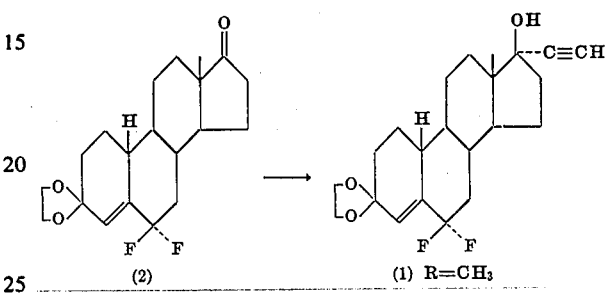

(2)    (1) R=CH₃

A mixture of 6,6-difluoro-4-estren-3,17-dione 3-ethylene ketal (2) (33.0 g.) and dimethyl sulfoxide (400 ml.) was stirred under nitrogen at 25° C., and treated with a 20 percent (w/v) suspension of sodium acetylide in xylene (250 ml.). After 30 min., the mixture was poured into ice water, saturated with NaCl, and extracted with $CH_2Cl_2$. The extracts were washed with brine, dried, and evaporated to leave the crude product (1). The same product was obtained when the ketal (2) was treated with ethynylmagnesium bromide or acetylene and potassium t-amylate, but the sodium acetylide method was the most convenient preparation.

EXAMPLE 2

Preparation of 6,6-difluoro-13β-ethyl-17β-hydroxy-17α-ethynyl-4-estren-3-one ethylene ketal from 17β-hydroxy 6,6-difluoro-17α-ethynyl-4-estren-3-one (6,6-difluoronorethindrone)

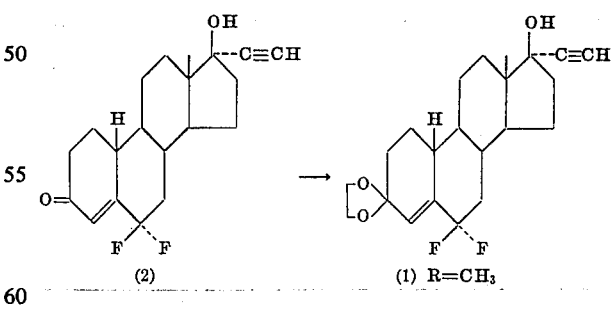

(2)    (1) R=CH₃

A pure sample of 17α-hydroxy-6,6-difluoro-17α-ethynyl-4-estren-3-one (3) (0.5 g.) in a mixture of benzene (25 ml.), oxalic acid dihydrate (0.5 g.) and redistilled ethylene glycol (2.5 ml.) was heated under reflux for 3 hours using a Dena-Stark trap, the progress of the reaction being followed by thin-layer chromatography (3:1 v/v ethyl acetate-cyclohexane; $R_f$ of compound 3=0.57; $R_f$ of compound 1=0.62) and the disappearance of the 1,680 cm.$^{-1}$ band in the IR spectrum. The benzene solution was washed with saturated $NaHCO_3$ and water, dried, and evaporated to leave the crude ketal (1) as a solid which was recrystallized from a mixture of chloroform, (5 ml.), hexane (5 ml.) and pyridine (1 drop). Pure ketal (1) formed colorless prisms (0.30 g.), m.p. 170°–171° C., $\lambda_{max.}^{EBr.}$ 3,450 (OH) and 3,310 cm.⁻¹ (C≡CH), $a_D{}^{24}$ −37° (c 0.65 CHCl₃), H¹ nmr δ=361 (d J=4) (4–H), 240 (d J=1) (ketal), 154 (s) (C≡CH), and 53 Hz. (s) (18–H).

| Anal. Calcd. for $C_{22}H_{28}O_3F_2$: | C, 69.71; H, 7.46; MW 378 |
|---|---|
| Found: | C, 70.09; H, 7.58; MW 378 |

EXAMPLE 3 dl-6,6-Difluoro-13β-ethyl-17β-hydroxy-17α-ethynyl-4-gonen-3-one ethylene ketal

A. dl-3β-17β-Diacetoxy-13β-ethyl-4,6gonadiene

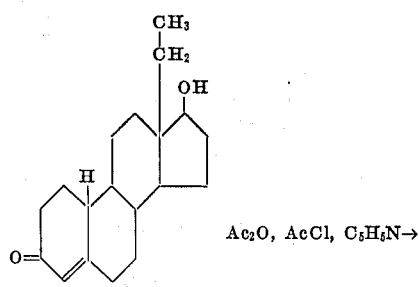

Ac₂O, AcCl, C₅H₅N→

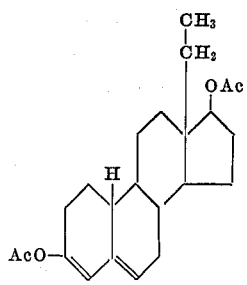

dl-18-Methyl-19-nortestosterone (13.8 g.), (prepared by the method of Smith, *J. Chem. Soc.* 1964, 4472 –4495),120 ml. of acetic anhydride, 60 ml. of acetyl chloride and 6 ml. of pyridine was heated under reflux for 2 hours; the volatiles were removed, and the residue was crystallized from methanol to give 17.8 g. of dl-3β, 17β-diacetoxy-13β-ethyl-4,6-gonadiene, m.p. 147°–149°.

| Anal. Calcd. for $C_{23}H_{32}O_4$: | C, 74.16; H, 8.66; MW 372.49 |
|---|---|
| Found: | C, 73.99; H, 8.70; MW 372 |

B. dl-3β-Hydroxy-17β-acetoxy-13β-ethyl-5-gonene

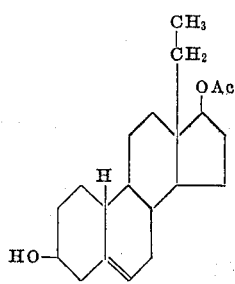

The product of step A (10 g.) was dissolved in 100 ml. of tetrahydrofuran, cooled to 0° C. and treated with 4.17 g. of cold sodium borohydride in 150 ml. of ethanol; and the mixture was stirred for 16 hours. The mixture was poured into ice water (500 ml.) and the solid (8.4 g.) removed by filtration. Crystallization from aqueous methanol gave the 17β-acetate, m.p. 138°–160° C.

| Anal. Calcd. for $C_{21}H_{32}O_3$: | C, 75.86; H, 9.70; MW 332.47 |
|---|---|
| Found: | C, 76.05; H, 9.76; MW 332 | dl-3β, 17β-Diacetoxy-13β-ethyl-5-gonene

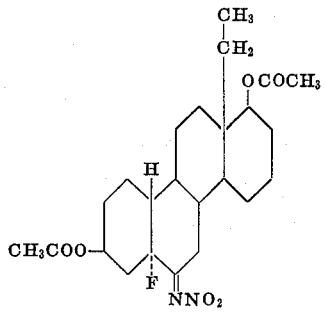

The product of step B was heated under reflux with 20 ml. of acetic anhydride and 20 ml. of pyridine for 2 hours and poured onto 350 g. of ice to give the diacetate, which was recrystallized from methanol, m.p. 144.5°–145.5° C.

| Anal Calcd. for $C_{23}H_{34}O_4$: | C, 73.76; H, 9.15 |
|---|---|
| Found: | C, 73.40; H, 9.18 |

D. dl-3β, 17β-Diacetoxy-5α-fluoro-13β-ethylgonan-6-one

Product of Step C: $\xrightarrow{\text{NOF+ NOBF}_4}$

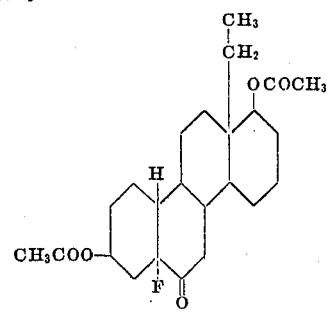

The product of step C (7.2 g.) in 80 ml. of methylene chloride was added slowly to a cooled (0° C.) solution of 4.67 g. of nitrosyl tetrafluoroborate in 120 ml. of glyme while a total of 6.37 g. of nitrosyl fluoride was introduced in a slow stream. The mixture was allowed to stand overnight, then it was poured into 500 ml. of brine, which was extracted twice with 100 ml. of methylene chloride. The organic solution was dried over sodium sulfate and the solvent evaporated to give 10.47 g. of dl-3β, 17β-diacetoxy- 5α-fluoro-6-nitrimino-13βethylgonane. The latter was dissolved in 30 ml. of benzene and passed through 100 g. of neutral alumina of activity grade III (containing 6 percent water) using 500 ml. of benzene as eluant. The steroid was rechromatographed using hexane, 3:1 by volume hexane: benzene, and benzene to give 6.94 g. of the dl-3β, 17β-diacetoxy-5α-fluoro- 13β-ethylgonan-6-one, which was recrystallized from acetone-hexane, m.p. 150°–154° C.

Anal. Calcd.
for $C_{23}H_{33}O_5F$:   C, 67.62; H, 8.14
Found:   C, 67.82; H, 8.07

E. dl-3β,17β-Diacetoxy-5α,6,6-trifluoro-13β-ethylgonane

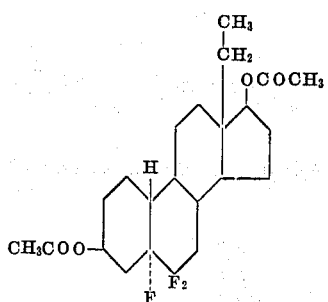

The product of step D, above, (3.2 g.) in 40 ml. of methylene chloride and one ml. of water was agitated with 80 g. of sulfur tetrafluoride at 25° C. for 10 hours. To the mixture was added 225 ml. of methylene chloride; the methylene chloride solution was then washed with water, 5% NaHCO₃, and brine and dried over MgSO₄. The solvent was evaporated and the product chromatographed on a "Florisil" column with hexane and 5 percent acetone:hexane. The center cuts were combined and recrystallized from acetone (10 g.) and hexane (25 ml.) to give the trifluorosteroid 2.61 g.), m.p. 169.5°–171.5° C.

Anal. Calcd.
for $C_{23}H_{33}F_3O_4$:   C, 64.17; H, 7.73
Found:   C, 64.37; H, 8.00

F. dl-3β,17β-Dihydroxy-5α,6,6-trifluoro-13β-ethylgonane

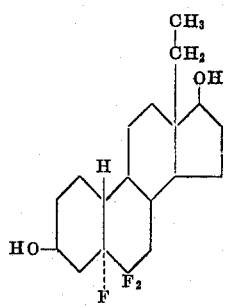

A solution of 2.45 g. of the preceding trifluorodiacetate from step E in 25 ml. of methanol and 3 ml. of concentrate HCl was heated to reflux for 1 hour. Water was added, and the mixture was cooled and filtered. Crystallization from aqueous acetone gave the diol in 98 percent yield, m.p. 95° C. dec.

Anal. Calcd.
for $C_{19}H_{29}F_3O_2$:   C, 65.89; H, 8.49
Found:   C, 65.55; H, 8.66

G. dl-5α,6,6-Trifluoro-13β-ethylgona-3,17-dione

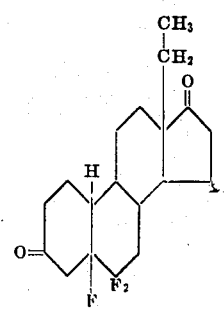

The diol from step F above (2.52 g.) was dissolved in 50 ml. of acetone and stirred for 30 minutes with 6 ml. of 8N CrO₃. The mixture was diluted with hot water to give a precipitate of the dione in about 90 percent yield. Recrystallization from acetone-hexane gave colorless crystals, m.p. 189°–190° C.

Anal. Calcd.
for $C_{19}H_{25}F_3O_2$:   C, 66.65; H, 7.36
Found:   C, 67.07; H, 7.61

H. dl-6,6-Difluoro-13β-ethyl-4-gona-3,17-dione

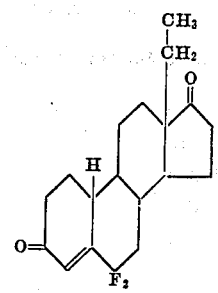

The dione obtained according to step G, above, (total of 3.8 g.) was dissolved in benzene and absorbed on a column of 150 g. of neutral alumina of grade III activity. After standing for 30 minutes, it was eluted with 1 liter of benzene. The benzene was evaporated and the residue crystallized from 90 ml. of acetone/hexane to give 2.87 g. of 6,6-difluoro-13β-ethyl-4-gona-3,17-dione, m.p. 171°–172° C.

Anal. Calcd.
for $C_{19}H_{24}F_2O_2$:   C, 70.78; H, 7.50
Found:   C, 72.50; H, 8.18

I. dl-6,6-Difluoro-13β-ethyl-4-gonene-3,17-dione-3-ethylene ketal

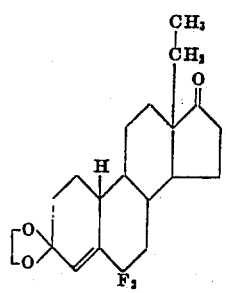

The above dione (2.5 g.) was heated under reflux (with a water separator) with 7.5 ml. of ethylene glycol, 2.5 g. of oxalic acid dihydrate and 100 ml. of benzene. After 6.5 hours, the mixture was extracted with 50 ml. of NaHCO₃ solution, 50 ml.

of water and dried over Na$_2$SO$_4$. The ketal had m.p. 186°–193° C. The structure was confirmed by infrared and the reaction monitored by TLC (using cyclohexane/ethyl acetate).

Anal. Calcd.
for C$_{21}$H$_{28}$F$_2$O$_3$:   C, 68.83; H, 7.70
Found:   C, 68.86; H, 7.93

J. dl-6,6-Difluoro-13β-ethyl-17β-hydroxy-17α-ethynyl-4-gonen-3-one-3-ethylene ketal

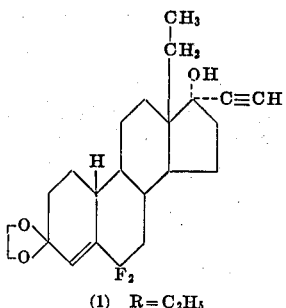

(1) R = C$_2$H$_5$

The monoketal of the product of step I, above, was dissolved in 20 ml. of dimethylacetamide and stirred under anhydrous conditions, while lithium acetylide-ethylene diamine complex (1 g.) was added, and acetylene was introduced for two hours. The mixture was decomposed with ice water, poured into brine and extracted with four 30 ml. portions of benzene, the extracts were washed with water and dried over Na$_2$SO$_4$. The benzene was evaporated, giving 1.15 g. of ketal.

Both new steroid compounds of this invention are useful progestational agents.

The subcutaneous progestational activity of 6,6-difluoro-17β-hydroxy-17α-ethynyl-4-estren-3-one ethylene ketal was determined by the Clauberg method as follows. Immature female rabbits weighing 800–1000 grams are estrogen-primed by means of daily subcutaneous doses of 5 μg. of estradiol benzoate for 6 consecutive days. Beginning on the seventh day for 5 consecutive days, the new material of this invention is administered once daily in 0.5 percent tragacanth by subcutaneous injection. The rabbits are autopsied on the twelfth day. Sections of the uterine tissue are examined microscopically and the uterine weight, ovarian weight and degree of progestational reaction in the endometrium are determined and compared with progesterone (total dose of 1 mg.).

The oral progestational assay was performed using the method of McPhail; The Assay of Progestin, *J. Physiol.* (London) 83: 145–156 (1934). Immature female rabbits received 5 μg. estradiol benzoate daily for 6 consecutive days (estrogen priming), followed by administration of the test material once daily in an aqueous vehicle for 5 consecutive days (days 7–11). The rabbits were sacrificed on day 12. 6,6-Difluoro-17β-hydroxy-17α-ethynylestr-4-en-3-one ethylene ketal was found to have about the same oral progestational activity as norethindrone.

The antiuterotrophic response of the test material was determined by the method of Dorfman et al.; Antiestrogen Assay of Neutral Steroids Administered by Gavage, *Endocrinology* 68: 43–49(1961). Intact weanling female Swiss-Webster mice were administered the test material daily by Gavage for 3 days in an aqueous vehicle. The mice simultaneously received a total dose of 0.4 μg. estrone in sesame oil by injection. The mice were sacrificed on the day following the last treatment. The antiuterotrophic activity of 6,6-difluoro-17β-hydroxy-17α-ethynylestr-4-en-3-one ethylene ketal was equal to or larger than that of norethindrone.

The embodiments of the invention in which an exclusive property or privilege is claimed are defined as follows:

1. A steroid compound having the formula

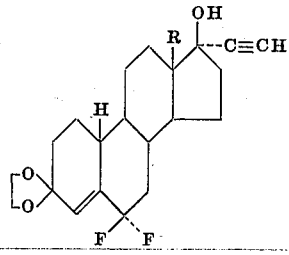

in which R is methyl or ethyl.

2. 6,6-Difluoro-17β-hydroxy-17α-ethynyl-4-estren-3-one ethylene ketal, the compound of claim 1 in which R is methyl.

3. 6,6-Difluoro-13β-ethyl-17β-hydroxy-17α-ethylnyl-4-gonen-3-one ethylene ketal, the compound of claim 1 in which R is ethyl.

* * * * *